United States Patent Office 3,167,506
Patented Jan. 26, 1965

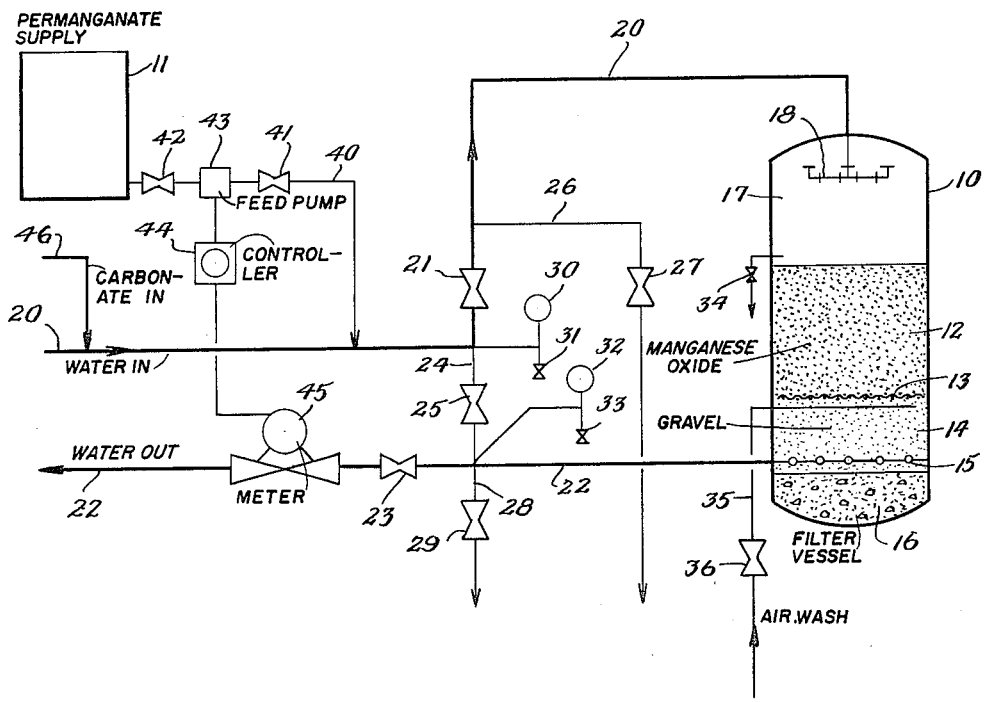

3,167,506
METHOD OF TREATING WATER TO REMOVE IRON AND MANGANESE
Richard B. Fackler, Drexel Hill, Pa., and Raymond R. Davis, Pitman, N.J., assignors to Hungerford & Terry, Inc., Clayton, N.J., a corporation of Delaware
Filed Mar. 22, 1961, Ser. No. 97,671
3 Claims. (Cl. 210—50)

This invention relates to a method for treating water to remove certain oxidizable materials, including soluble iron and manganese. It is especially concerned with a method involving treatment of the water with permanganate ion and filtration through a manganese oxide zeolite bed.

The art dealing with the removal of oxidizable material from water is well developed. However, there are certain waters which have caused great trouble to the art, and which have proved to be extremely difficult and expensive to treat satisfactorily by prior art methods. The oxidizable material which renders these waters objectionable is most commonly soluble or colloidal iron or manganese, although both of these materials may be found in a given water. Other chemically similar low valence metal ions may also be present.

These waters have been found to contain, in addition to the above materials which are in the ordinary case easily oxidizable, certain complex organic materials which may be termed here "sequestering agents," or "oxidation inhibitors." The effect of the sequestering agents is to almost completely insulate the objectionable iron and manganese from attack by the oxidizing methods known in the art. The organic materials in the water may be grouped in two broad classifications: naturally occurring and man-made pollutants. Sequestering agents of the first class may enter well water, for example, during the passage of the water through beds of earth containing large amounts of organic material. Agents of the second class enter the water as waste from household or industrial operations. An example of an oxidation inhibitor of this type is alkylbenzenesulfonate which is a component of common household detergents. This material, even though present in very small concentrations in well water, is extremely effective as a sequestering agent.

Aside from the above components which appear to be common to all of the waters under consideration here the other components of the water, as found naturally, may vary widely. For example, the water may or may not contained dissolved oxygen and it may be acidic or basic.

Despite the difficulty of removing iron and manganese in this type of water, the removal is very important because these materials cause the water to have objectionable odor, taste and appearance. In addition, a number of industrial processes require water extremely low in these materials; the tolerances for some industrial purposes being much lower than those for water for human consumption. Waters containing iron and manganese, and organic sequestering agents, are very difficult to deionize by the ion exchange methods known in the art. It has been found that the organics, especially, tend to clog or damage the ion exchange resins. Therefore, removal of iron, manganese, and organic sequestering agents is an important preliminary treatment for waters which are to be deionized.

It is well known in the art to use manganese oxide, either in conjunction with natural or artificial zeolites, or alone, as a treating and filter medium for removing oxidizables from water. Such manganese oxide beds contain in most instances a large proportion of the higher oxides of manganese, that is, oxides in which the oxidation number of manganese is in the region of 4. However, certain practices in the art involve the use of manganese oxide beds containing reduced forms of manganese oxide where the oxidation number of the manganese is appreciably below 4.

Restricting our attention to the type of manganese oxide bed containing for the most part higher oxides of manganese, it can be pointed out that such a bed may operate on waters containing oxidizable material in three ways. First, it may operate as an oxidizing agent, converting the iron and manganese to insoluble oxides and/or hydroxides, in which case the manganese oxide becomes reduced or degraded to lower and possibly soluble oxides and hydroxides with the passage of time. Some of the reduced oxides may leach into the water passing through the filter, and appear in the effluent. Thus, under certain conditions, the end result will be the addition of manganese to the water rather than the removal of it. In addition, a bed of manganese oxide which is operated in this manner must be periodically regenerated, that is, raised once again to higher oxides of manganese, by treatment with strong oxidizing agents, for example, potassium permanganate solution or other permanganates. This operation is generally performed in conjunction with a back washing and/or air washing of the filter bed and materially increases the time during which the filter bed is off stream.

Second, the manganese oxide bed may operate as an oxidation catalyst. That is, the higher oxides of manganese incite or catalyse the oxidation of the iron and manganese by dissolved oxygen or other oxidizing agents present in the water. It is not necessary to understand the exact mechanism of the catalysis in order to understand our invention. However, it may be pointed out that this mechanism may be chemical, where the oxides enter into the reactions without being destroyed, or mechanical, or a combination of both mechanisms. It has been found that the higher oxides of manganese are more effective oxidation catalysts than the lower oxides.

Third, the manganese oxide operates as a mechanical filter medium. It performs this function concurrently with either of the above mechanisms.

We have discovered that greatly improved water results when troublesome waters of the character described above, containing soluble iron and/or manganese together with organic sequestering agents, are subjected to certain preparatory steps and then passed through a filter containing higher oxides of manganese under conditions which result in said filter operating catalytically. The preparatory steps, both of which are essential to the operation of our process, comprise, first, the adjustment of the pH of the water to a level of at least 6.0 and, second, the addition of permanganate ion to the water before it is passed through the filter bed.

It is an object of our invention to provide a method for removing iron and manganese from water containing organic sequestering agents or oxidation inhibitors.

It is a further object of this invention to provide a method for producing water having extremely low iron and manganese content and excellent taste, odor and appearance from water in which the iron and manganese are in oxidation resistant forms.

Another object of our invention is to provide a method for operating a bed of higher manganese oxides in a water treatment operation catalytically, thereby eliminating the necessity for separate regeneration of the manganese oxide bed.

It is a further object of our invention to provide a method of water treatment in which the time during which the manganese oxide filter unit is necessarily off stream for rehabilitation is materially reduced.

Still another object of our invention is the provision of a method for treating waters containing iron and manganese in which temporary deviation from the proper rate of addition of reactant is automatically compensated for.

Another object of our invention is the provision of a method for removing organic sequestering agents, together with iron and manganese, from waters in preparation for further treatment by deionization operations.

The above objects and purposes together with other objects and purposes may best be understood by considering the detailed description which follows together with the accompanying drawing which illustrates diagrammatically a water treating installation employing the method of our invention.

Of the above mechanisms of operation of a filter bed containing higher oxides of manganese, it is much preferred to utilize the catalytic method inasmuch as this eliminates the necessity for time consuming and expensive periodic regeneration of the filter bed. In order for the bed to operate catalytically it is necessary that the water itself contain material capable of oxidizing iron and manganese. Some naturally occurring waters contain such oxidizing material in the form of dissolved oxygen while other natural waters do not. There are known in the art various ways of providing oxidizing material in water, examples of which are: aerating the water either by passing it through spray towers or by blowing air through it, or metering into a flowing stream measured quantities of air; treating the water with hypochlorite or chlorine gas; adding permanganate to the water; or adding certain other materials such as iodine or bromine.

We have discovered that for treatment of waters containing organic sequestering agents or oxidation inhibitors permanganate is a most effective material for use in supplementing whatever oxidizing material is in the water, if any, because it attacks more successfully than other materials the organic sequestering agents. This attack renders the organics ineffective as shields to the oxidation of soluble iron and manganese.

We have discovered that a filter bed of higher oxides of manganese may be operated catalytically to produce water containing negligible amounts of iron and manganese if there be added to the water before it is passed through the filter enough permanganate to perform the following functions: The permanganate must attack successfully the organic sequestering agents to render them inactive as oxidation inhibitors. The permanganate must also provide, in conjunction with whatever oxidizing material, if any, is present in the water, enough oxidizing material to oxidize the soluble iron and manganese. (It should be noted that certain intermediate oxidation products may themselves act as oxidizing agents, thereby providing additional oxidizing material in the water.) In most cases the iron and manganese will be at least partially oxidized before the catalytic filter is reached, but it is not essential to our process that any appreciable oxidation take place before the filter. By providing in the water sufficient oxidizing material, assurance is obtained that the higher oxides of manganese in the bed will operate catalytically, that is, that they will catalyse the oxidation of the iron and manganese by the material in the water instead of oxidizing the iron and manganese by becoming reduced oxides of manganese. It is also necessary to provide enough permanganate to regenerate or, more precisely, raise once again to the higher oxidation states, the manganese oxide of the bed, if through faulty prior operation it has become partially reduced to lower oxides of manganese. The amount of permanganate for this function will generally be quite small because the object is not instantaneous large scale regeneration but a continuous small scale "repair" or "maintenance" operation. Enough permanganate must be added to perform all of these functions, but the amount must be held below a critical upper limit. This limit is imposed by virtue of the fact that, if too much permanganate is added, permanganate ion will appear in the effluent from the filter, because the filter contains substantially no lower oxides to remove the excess.

Because of the complexity of the oxidation-reduction system involved here, it is rather difficult to define or calculate rigorously, for a given water, the amount of permanganate ion necessary to meet the requirements outlined above. However, we have found, as another very important aspect of our discovery, that the presence or absence of the quantity of permanganate defined above may readily be determined by inspecting the color of the water entering the filter bed. That is to say, the concentration of permanganate in the water as it enters the filter, sufficient to meet the above requirements, coincides very nearly with the concentration of permanganate which causes an abrupt color change in the water.

We have found that, in addition to the above color correlation, the correct amount of permanganate may be determined from a consideration of the pH of the entering water, before the addition of permanganate, and the redox potential of the water, with the permanganate added, just as it enters the filter. That is to say, we have found the level of permanganate described above to be present at the filter entrance, if the redox potential of a sample taken at that point (as measured in a cell with a calomel reference electrode and a platinum electrode), is related to the pH of the water, before the addition of the permanganate, according to the following table:

| pH: | Redox potential millivolts (calomel-pt) |
|---|---|
| 5 | +0.44 |
| 6 | +0.32 |
| 7 | +0.14 |
| 8 | +0.04 |
| 9 | −0.20 |
| 10 | −0.28 |

Of course, the redox value for intermediate values of pH may be determined from a graphical plot of this data, or by interpolation, or by derivation of the equation of the line of the data. Although, as discussed more fully below, a pH in the incoming water above about 6.0 is required for satisfactory catalytic operation of the filter, we have provided redox data for pH's as low as 5, to indicate the permanganate requirements in the threshold area.

It should be noted that if an insufficient amount of permanganate is added over a relatively short period of time the product will continue to be satisfactory because the higher oxides of manganese will operate, at least partially, as oxidizing agents, as distinguished from catalysts. However, if this state of affairs is allowed to continue for too long a period, the bed will become largely degraded to lower oxides of manganese and hence ineffective as a catalyst.

We have found it necessary for satisfactory catalytic operation of a manganese oxide bed that the pH of the water be adjusted to a relatively high level, for example at least above about 6.0. Many waters contain, in their natural state, appreciable amounts of bicarbonate ion which creates a buffer system to hold the pH in the water in the neighborhood of 7. For waters which are not naturally alkaline by virtue of bicarbonate or otherwise, we prefer to accomplish the essential adjustment of the pH by creating a bicarbonate buffer system through the addition of sodium carbonate or, if the water contains carbon dioxide, sodium hydroxide. Those skilled in the art are aware of other materials which may be added to accomplish the adjustment of the pH. The adjustment of pH may take place either before or after the addition of permanganate.

While satisfactory operation may be obtained for waters containing iron, manganese, or both, if the pH is raised to above about 6.0, we prefer that the pH be above about 7.5 if manganese is present, either alone or with iron, and above about 7.0 if iron alone is present.

In addition to rendering catalytic operation with a bed impossible, an attempt to practice our method without adjustment of the pH to the levels discussed above will result in undesired properties in both the effluent and the filter bed. For example, suppose the manganese to be removed is present in the form of a sulfate or chloride. The oxidation, whether by permanganate or by the oxides in the bed, will result in replacement of the manganese with hydrogen ion, thereby creating highly ionized sulfuric or hydrochloric acid which will lower the pH even further. This may cause the manganese oxides in the bed to act as bases to neutralize the acid, thereby precluding their operation as catalysts.

It is known in the art to use large quantities of permanganate material in excess of those under consideration here in order to sterilize the water by killing the germs and other living material in it. It is also known to filter such water with the added permanganate over beds of reduced manganese oxides to remove the excess permanganate. However, such an operation does not contemplate catalytic operation of the filter bed since, in fact, the bed must contain reduced manganese oxides in order to function in this way. After long periods of time the reduced manganese oxides will, of course, be raised to higher oxides. However, it should be pointed out that in this event, if the bed contains primarily higher oxides of manganese, the effluent will contain the permanganate ion because the higher oxides are incapable of removing the excess.

It is also known in the art to add a small amount of permanganate to water before passing it through a filter of reduced or oxidized oxides of manganese. By this process it was thought that a colloid is formed, which colloid was intended to be flocculated within the bed and during the process of flocculation germs were dragged out of the water onto the filter medium by the flocculant. However, such a technique does not involve catalytic operation of the filter bed and does not result in the addition of enough permanganate to meet the requirements for catalytic operation.

Inasmuch as both of the above prior art practices are directed to removal of germs from the water, it should be pointed out that this is not an object of the present invention. Removal of germs may be accomplished as well by, and more economically by use of other methods which are well known in the art. If the water which is to be treated by the process of our invention presents sterilization problems, our process will be effective in removing the germs, or killing them. However, our process is very effective on waters not presenting sterilization problems, and, further, it is generally more desirable to use other means for removing germs from waters which do not present the unique problems of the waters under discussion here.

One further prior art practice should be mentioned. It is known to treat waters containing iron and manganese in easily oxidizable forms, and containing substantially no sequestering agents or oxidation inhibitors, by first dissolving oxygen in the water, by aeration or otherwise, and then filtering the water through a catalytically operated manganese oxide bed. However, this process does not result in a satisfactory effluent when troublesome waters of the character discussed herein are treated.

Certain materials are known to operate as oxidation catalysts when added to water. An example of such a catalyst is copper ion in small concentrations. Catalysts of this type, may, if desired, be added to waters being treated by the method of our invention.

Turning now to the accompanying drawing which illustrates diagramatically equipment for the practice of our invention and normal directions of flow through the equipment, it can be seen that the principal components are a filter vessel 10 and a permanganate supply tank 11. Within the filter vessel 10 is a bed of manganese oxide or manganese oxide zeolite 12. Beneath the bed is a retaining screen 13 separating the bed from a supporting bed of gravel 14. An underdrain system 15 is located at the bottom of the gravel bed 14. The lower portion of the filter vessel is filled with concrete or other suitable material as at 16 to provide a flat bottom for the gravel bed. Above the manganese oxide bed 12 there is a freeboard zone 17. Near the top of this zone is an inlet distributor and wash water collector 18.

The general flow of water through the installation is as follows: Water enters through the inlet line 20 which has in it an inlet valve 21. After passing the inlet valve it is conducted to the top of the filter unit 10 and enters the unit through the inlet distributor 18. After passing through the filter the water is gathered by the underdrain system 15 and conducted away through the outlet line 22 which contains an outlet valve 23. Our process will operate successfully in a system such as this over a wide range of pressures, for example from gravity flow up to and beyond 150 p.s.i.

There is an interconnecting line 24 between the inlet and outlet line containing the back wash valve 25. There is also a wash waste line 26 running off the inlet line between the inlet valve and the filter unit, which line contains the wash waste valve 27. In addition, the outlet line 22 has a rinse waste line 28 running off it, which line contains the rinse waste valve 29. The pressure gauge 30 and the sample tap 31 are located on the inlet line. The pressure gauge 32 and the sample tap 33 are located on the outlet line. In addition, there is a sample tap 34 provided on the filter vessel 10 at a point just above the top of the manganese oxide filter bed 12.

After the system has been in operation for a considerable time, the filter bed will be partially clogged by the precipitates of iron, manganese, etc. Therefore, it is desirable to periodically back wash the filter bed to remove the precipitates and restore the mechanical and catalytical efficiency of the bed. It is much preferred to precede the water back wash of the bed with an air wash because we have found that the water wash alone does not satisfactorily remove the precipitate and results in an impaired catalyst. Therefore, there is provided the air line 35 positioned to convey air under pressure to a point below the manganese oxide bed. This line contains the air valve 36. A typical washing operation consists, first, in closing the inlet valve 21 and the outlet valve 23, thereby shutting off the supply of water. The wash waste valve 27 is then opened; after the filter has partially drained, the air valve 36 is opened and air at a pressure of about 5 p.s.i. is forced through the filter bed. The air washing under typical conditions occupies about 10 minutes. Following this the air valve 36 is closed, and the back wash valve 25 is opened. In this way incoming water is run into the bottom of the filter and passed out the top of the filter, carrying with it the loosened precipitates, and ultimately away from the system through the wash waste line 26. The bed is then rinsed for approximately 5 minutes. This is done by closing valves 25 and 27 and opening inlet valve 21 and rinse waste valve 29. At the completion of the rinse, the valve 29 is closed and the outlet valve 23 is opened, thereby placing the unit back on stream. Under typical conditions the back washing and rinsing steps would occupy about 25 minutes. While it is difficult to generalize concerning the desirable frequency of the washing operations for all waters and all operating pressures, it can be pointed out as a general guide that washing is desirable when the pressure drop across the bed, that is, the difference in the pressure readings between pressure gauges 30 and 32, has risen to significantly over the normal pressure drop at the beginning of a run with a fresh bed.

The permanganate supply tank 11 is connected to the inlet line 20 through the supply line 40 which contains two isolating valves 41 and 42. (During the washing operations at least one of the isolating valves is closed to cut off the feed of permanganate into the water which is being used for wash purposes.) The supply line 40 contains a controlled volume feed pump 43 which is electrically connected to a proportioning controller 44. The controller 44 is in turn electrically connected to a totalizing meter 45 located in outlet line 22. This arrangement is preferred because the flow through the system will almost vary with time and it is desirable to maintain the same proportionate rate of addition of permanganate regardless of the flow rate. The controller 44 is adjustable to increase or decrease the rate of addition of permanganate to the incoming water in accordance with the results of the monitoring operation to be discussed hereinbelow. (In some smaller installations the water may be supplied from a well through an on-off high pressure pump which delivers at a substantially constant rate when running. In such an installation the proportioning pump 43 and controller 44 may be electrically connected to the well pump, instead of to the meter 45.)

Sodium carbonate solution or powder is added to the incoming water through the line 46. While the equipment is not shown on the drawing, the same considerations which mitigated in favor of a proportionate addition of permanganate make it desirable that the pH correction material be in amounts proportional to the flow rate; therefore, similar proportional feed system is desirable for the sodium carbonate addition.

With the above description of the equipment in hand, the operation of the installation to practice our invention may be outlined. Water entering the inlet line 20 is raised to a pH of at least 6.0 by the addition of sodium carbonate through the line 46. If the natural pH of the water is above 6.0, this step may be omitted. The amount of permanganate necessary to perform the functions required of it, discussed above, is fed into the incoming water in the line 20 through the line 40. The water passes into the top of the filter through the distributor 18, through the filter including the gravel bed 14 beneath the manganese oxide bed and out through the outlet line 22. Samples are taken periodically from the sample taps 31, 34, and 33 for the purpose of monitoring the amount of permanganate in the water. It can be pointed out that the linear velocity of the water in the line 20 between the sample tap 31 and the distributor 18 is quite high compared to the linear velocity of the water between the distributor head 18 and the top of the manganese oxide bed where the sample tap 34 is located. Therefore, in terms of residence times the points 31 and 18 may be considered to almost coincide.

As was pointed out above, the optimum amount of permanganate necessary for the practice of our invention will result in the water at or very near the top of the manganese oxide bed being on the verge of an abrupt change of color. This color change, ignoring the presence of other colored materials in the water which may somewhat mask it, is from faintly pink to clear. It is very abrupt, as we have found that an increase in concentration of less than 0.5 part per million of permanganate will result in a solution turning from clear to pink. Since the reaction between permanganate and the sequestering agents and iron and manganese are not instantaneous, there will be a gradation in the color of the water between the distributor 18 and the sample tap 34. On the basis of this we have evolved two alternate systems of monitoring, both of which result in controlling the concentration of permanganate at the entrance of the bed at the desired level.

In the first system of monitoring, samples are drawn through the sample taps 31 and 34. For proper operation the sample from the tap 31 should have, immediately after it is drawn, a distinct pink color and the sample from the tap 34 should be clear. In the second system of monitoring a sample is drawn only from the tap 34. For proper operation this sample should have, immediately after it is drawn, a very faint pink color which may be characterized as "just pink." (Similarly, the sample taken from the tap 34 under the first system may be characterized as "just clear.") While the rate of addition of permanganate to meet one of these tests would be slightly different than that to meet the other, the difference is so slight as to be negligible because the color change from pink to clear is so abrupt.

Periodical samples are also taken from the sample tap 33 on the outlet line. These samples in a large installation are analyzed for manganese and iron content, in addition to whatever other quality control measurements are appropriate for water entering the using system.

If the monitoring operation, regardless of which system is used, indicates that the water at the top of the bed, that is, at 34, is too pink, the operator adjusts the controller 44 to reduce the rate of addition of permanganate. If the monitoring indicates that the water at the point 34 is too clear, as would be indicated, for example, by a comparatively faint pink in a sample taken from the tap 31, the operator adjusts the controller 44 to increase the rate of addition of permanganate. If the sample taken from the outlet line, that is, the tap 33, shows any trace of pinkness, this is an indication to the operator that the rate of permanganate addition is too high and he makes an adjustment accordingly.

The samples taken from the tap 31 or from the tap 34 should be analyzed periodically for pH and, in the event that the pH is too low, the rate of addition of sodium carbonate through the line 46 is increased.

Other systems of monitoring may be used. For example, redox measurements may be taken on samples from tap 34 using the table given above to obtain the proper rate of addition of permanganate. Also, certain standard semi-quantitative or quantitative colorimetric tests may be made on such samples. However, we have found that the color condition of the samples is so time dependent and transitory that colorimetric measurements utilizing apparatus which takes an appreciable time to manipulate are less reliable than the simple monitoring systems outlined above. Therefore, we prefer to rely on simple color inspection.

The desired frequency of the monitoring operations is difficult to define generally. However, it can be pointed out that waters from a given well, for example, may change in characteristics appreciably during the space of a day. Therefore, the streams should be monitored at least once daily and preferably several times during a given run, that is, from one washing operation to the next.

During the above description we have referred to manganese oxide beds. This usage both above and in the appended claims is meant to include both manganese oxide-zeolite beds and manganese oxide beds containing no zeolite, for example a bed made up of pyrolusite, a naturally occurring manganese oxide ore. Generally, we prefer the use of manganese oxide-zeolite beds because it is possible to manufacture such beds so they contain manganese oxide in the form desired for the operation of our process.

We have found the method of our invention to be unusually successful in the treatment of troublesome waters of the character discussed above, which waters have been heretofore extremely resistant to successful treatment by conventional methods. The product water of our process has extraordinarily fine quality with good appearance, taste and odor properties. It should be pointed out that the water resulting from our process has no objectionable odor or aftertaste such as results from chlorine type treatment. Oxidation resistant water such as those under consideration here when treated with chlorine in an attempt to remove the iron and manganese requires so much chlorine that very often dechlorinization is necessary as an after step in order to make the water at all palatable.

Our process presents another considerable advantage because the manganese oxide regeneration step involving treatment of the bed with concentrated solutions of potassium permanganate is eliminated. This step in more conventional operations is usually performed immediately after the air washing and back washing steps. We have found that the time during which a given filter unit must be taken off stream is, in a typical operation, reduced from about 1 to 2 hours for conventional processes to about 0.2 to 0.5 hour for our process. In addition, our process results in a saving of permanganate because a large excess is not used as is the case when a separate regeneration cycle is employed. Water is saved also because no separate rinse steps are required after regeneration of the bed to remove excess permanganate. An additional advantage results from the elimination of the problem of disposing of the excess permanganate used in the regeneration step.

We claim:

1. In the art of treating water containing ions from the class consisting of iron and manganese by adjusting the pH to at least about 6.0, adding permanganate to said water as it is being fed to a manganese oxide filter bed and passing it through said manganese oxide filter bed, the improvement which comprises adjusting the quantity of permanganate which is added to the water being fed to said filter so that the water is distinctly pink upstream from the filter but not more than sufficient to produce a faintly pink color at the entrance to the bed.

2. In the art of treating water containing ions from the class consisting of iron and manganese by adjusting the pH to at least about 6.0, adding permanganate to said water as it is being fed to a manganese oxide filter bed and passing it through said manganese oxide filter bed, the improvement which comprises adjusting the quantity of permanganate which is added to the water being fed to said filter so that the water is distinctly pink upstream from the filter but insufficient to produce a pink color at the entrance to said filter bed.

3. In the art of treating water containing ions from the class consisting of iron and manganese by adjusting the pH to at least about 6.0, adding permanganate to said water as it is being fed to a manganese oxide filter bed and passing it through said manganese oxide filter bed, the improvement which comprises adjusting the quantity of permanganate which is added to the water being fed to said filter before it enters said filter bed to condition the water so that the redox potential of the water approximately at the bed entrance has a value with respect to the pH of the water before permanganate is added substantially in accordance with the following table:

pH (before permanganate addition) : (calomel-pt electrodes)

| pH | Redox potential millivolts |
|---|---|
| 5 | +0.44 |
| 6 | +0.32 |
| 7 | +0.14 |
| 8 | +0.04 |
| 9 | −0.20 |
| 10 | −0.28 |

References Cited by the Examiner

UNITED STATES PATENTS

| 1,082,315 | 12/13 | Gans | 210—63 X |
| 1,107,199 | 8/14 | Massatsch | 210—50 |
| 1,253,840 | 1/18 | Kobelt | 210—50 |
| 1,750,561 | 3/30 | Adler et al. | 210—50 |
| 2,132,592 | 10/38 | Wells et al. | 210—50 X |
| 2,144,051 | 1/39 | Frankforter | 210—50 |

FOREIGN PATENTS 10,080   1906   Great Britain.

OTHER REFERENCES

Adams: Manganese Removal by Oxidation With Potassium Permanganate, Jour. AWWA, February 1960, vol. 52, pp. 219–228.

Oxidation Reduction Potential Measurements Applied to Iron Removal, Weart et al. Jour. AWWA, vol. 49 September 1957 pp. 1223–1233.

Water Conditioning Handbook, The Permutit Company, N.Y., 1954, page 9/4.

MORRIS O. WOLK, *Primary Examiner.*

CARL F. KRAFT, *Examiner.*